Dec. 17, 1957     B. HOGUE ET AL     2,816,359
SHEARS
Filed May 24, 1954     3 Sheets-Sheet 1

JAMES K. McALPINE
BENTON HOGUE
        INVENTORS

BY
        ATTORNEY

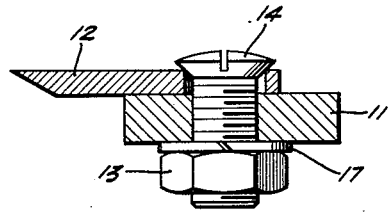
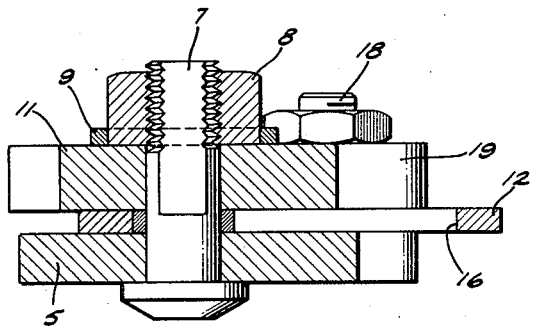
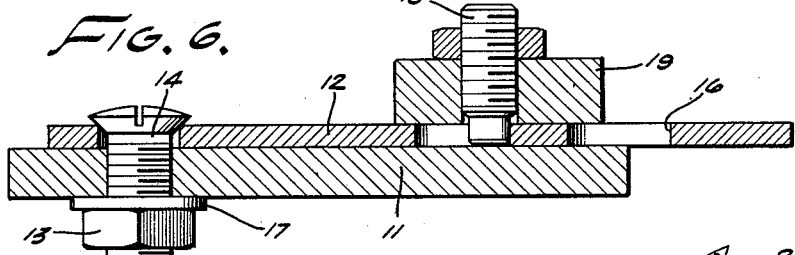
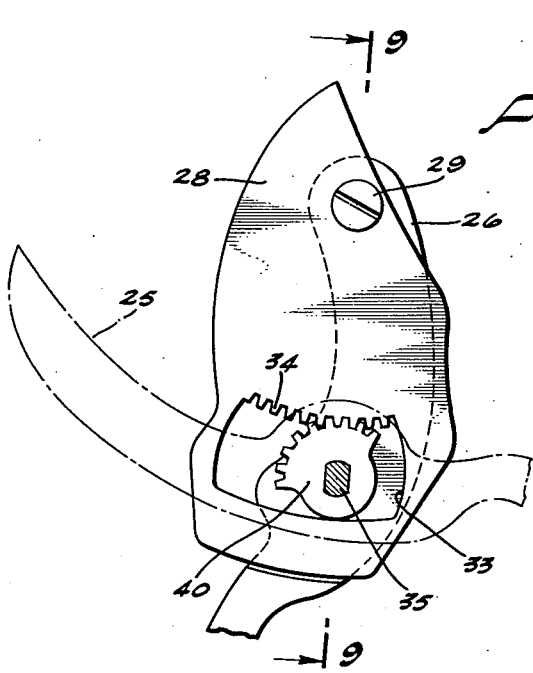
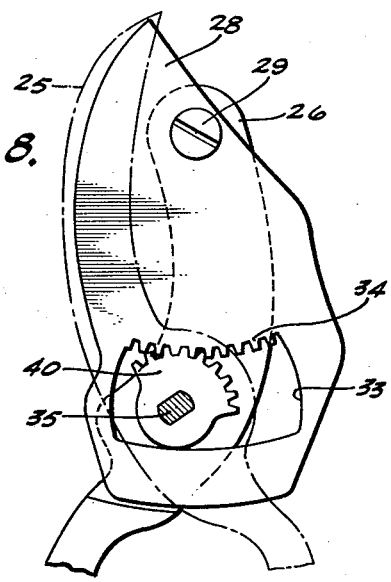

JAMES K. McALPINE
BENTON HOGUE
INVENTORS

United States Patent Office 2,816,359
Patented Dec. 17, 1957

2,816,359
SHEARS

Benton Hogue and James K. McAlpine, Bakersfield, Calif.

Application May 24, 1954, Serial No. 431,968

7 Claims. (Cl. 30—239)

This invention relates to cutting tools, and particularly to pruning shears using a leverage action. The principles embodied in the shear mechanism permits the shears to be particularly effective for cutting woody materials, wire, sheet metal, plastics, and cloth. The invention improves both light and heavy-duty shears, both hand and power operated.

Pruning shears having curved blades and mechanical leverage amplification are well known. An early form of pruning shears is disclosed in Patent No. 466,879, of January 12, 1892, while a more recent form, having mechanical leverage, is shown in Patent No. 2,436,260, of February 17, 1948.

The present invention is directed to pruning shear mechanisms which are an improvement over prior shears, the improvement being embodied in the action of the blades during the cutting operation. Three forms of mechanical operation are obtained, one by the use of a pinion and rack combination, another by a pin and slot combination, and a third by a cam operation, all of which embody a new action in the cutting operation. For instance, the improvement in the cutting action is obtained by having one blade move longitudinally along the cutting edge of the other blade so as to provide, in addition to the shearing action, a sort of sliding or slicing cutting action. To provide this relative motion between the two blades, the principal cutting blade is pivoted near its outer end, while its lower end is rotated on the pivot by either the above-mentioned pin and slot combination, pinion and rack combination, or cam mechanism. This causes a drawing in toward the fulcrum of the shears of the material being cut to provide an improved cutting action. Although certain other prior shears have attempted to obtain a different relative motion between the edges of the cutting blades, the present invention has permitted an action which provides a clean, easily made cut, which is particularly advantageous for pruning trees, shrubs, grapevines, etc.

The principal object of the invention, therefore, is to facilitate the cutting of various materials.

Another object of the invention is to provide an improved shear mechanism having a combination of shearing and slicing actions.

A further object of the invention is to provide an improved slicing shear having mechanical amplification, and particularly adapted for cutting large woody material to provide a clean, smooth severing of the material.

The novel features which are believed to be characteristic of this invention, both as to the manner of its organization and the mode of its operation, will be better understood from the following description, when read in conjunction with the accompanying drawings, in which:

Fig. 4 is a detailed cross-sectional view taken along the line 4—4 of Fig. 1.

Fig. 5 is a cross-sectional view taken along the line of 5—5 of Fig. 3.

Fig. 6 is a detailed cross-sectional view taken along the line 6—6 of Fig. 3.

Fig. 7 is a partial elevational view of another modification embodying the invention.

Fig. 8 is a partial elevational view of the invention shown in Fig. 7, showing another blade position.

Figure 1:
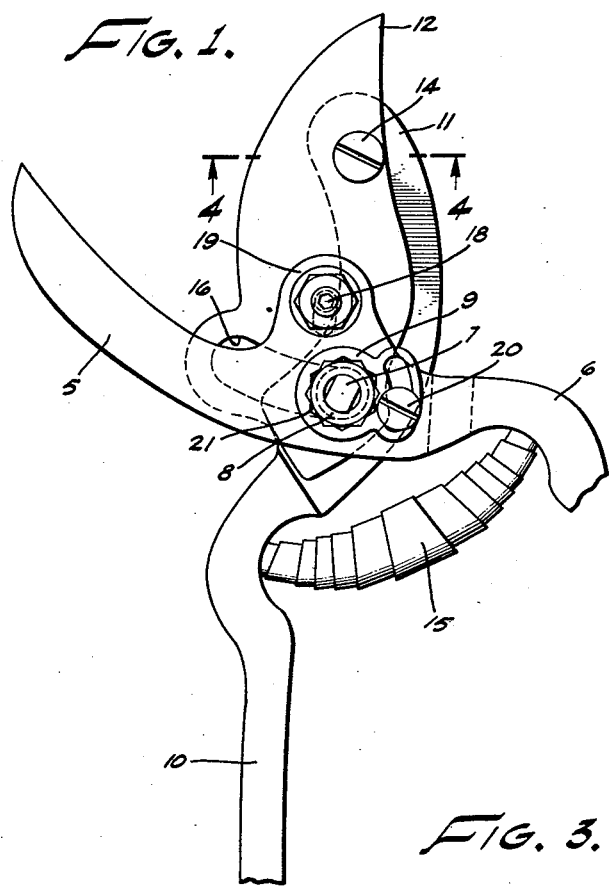
Fig. 1 is a partial elevational view of one modification embodying the invention.

Referring, now, to the drawings, and particularly to Figs. 1 to 6, inclusive, in which the same numerals identify like elements, a main fixed blade 5 is integral with its handle 6 and pivoted on a bolt 7.

The cooperating handle 10 of the other blade is also pivoted on the bolt 7 and has an end section 11 for carrying a cutting blade 12 pivoted on the section 11 by a bolt 14, the blade 12 being between blade 5 and section 11. The bolt 7 has a nut 8, and washer 9 thereon, and bolt 14 has a nut 13 and washer 17 thereon. A screw 20 holds lock washer 9 on bolt 7 to prevent nut 8 from turning to the right or left during operation of the shears. The base portion of the blade 12 has an elongated arcuate slot 16 cut therein in which is located bolt 7. The slot 16 is cut on a radius from the center of bolt 14. A spiral spring 15 actuates the blades to "open" position as shown in Fig. 1.

Figure 3:
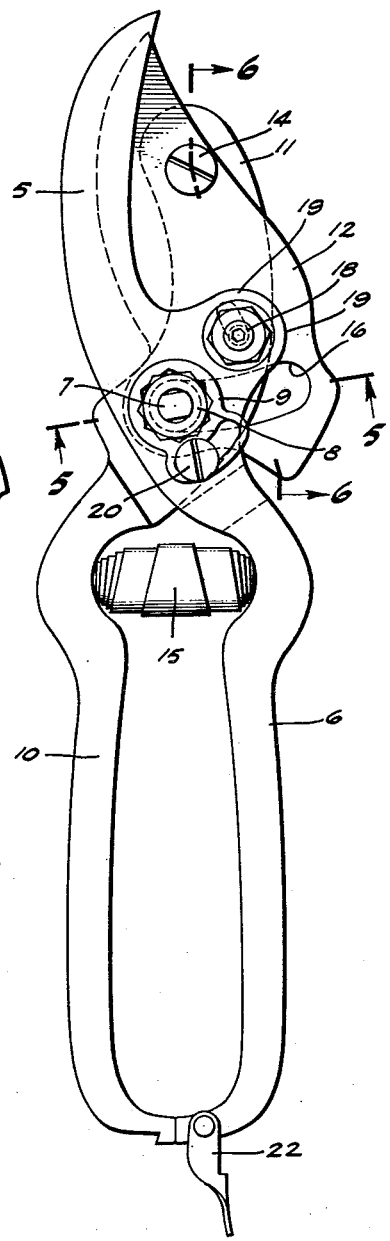
Fig. 3 is an elevational view of the modification shown in Fig. 1, showing another position of the cutting blades.
Figure 2:
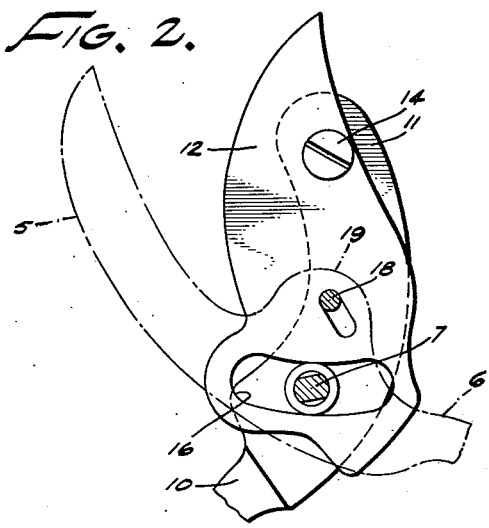
Fig. 2 is a detailed view of the modification shown in Fig. 1, showing another position of the cutting blades.

Upon movement of the handles 6 and 10 toward and into the position shown in Fig. 3, the section 11 moves the outer end of blade 12 toward the blade 5. Simultaneously, a pin 18, mounted on ear 19 of the blade 5, shifts the base portion of the blade 12 about the pivot 14, the base portion of the blade 12 moving along the elongated slot 16 over the main pivot bolt 7. There is thus obtained a rotary action of the blade 12, which not only increases the mechanical leverage obtained in the cutting action, but also permits the cutting edge of the blade 12 to move longitudinally on the edge of the blade 5.

In this manner, a sliding or slicing action is obtained in addition to the normal shearing action of the shears. This slicing action avoids damage to the delicate inner layer under the bark of all plants, trees, and shrubs, making a desirable pruning shear. Furthermore, the movement of blade 12 tends to draw or pull the object being cut into the bottom of the V between the blades which increases the mechanical leverage of the shears. This is of great advantage for metal cutting shears. Thus, the shears are particularly suitable for pruning fruit trees and grapevines because of the ability to provide a clean cut, the mechanical amplification permitting the shears to be used on large limbs and vines easily. The handles 6 and 10 when not in use are held in closed position by means of a standard type of latch 22.

Figure 9:
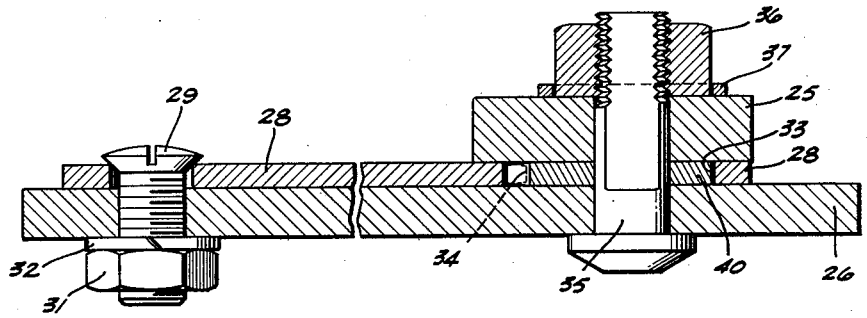
Fig. 9 is a detailed cross-sectional view taken along the line 9—9 of Fig. 7.

Referring now to Figs. 7, 8, and 9, a blade or jaw 25 is similar to blade 5, Fig. 1, while the arm section 26 is similar to the section 11 in Fig. 1. A convex cutting blade 28 is pivoted on a bolt 29 in the section 26 and held in position by nut 31 and washer 32. The lower or back portion of the blade 28 is provided with an arcuate slot 33, one side of which is a toothed rack 34. The section 26 and blade 25 are pivoted on a bolt 35, the bolt being held in position by nut 36 and washer 37. A gear segment 40 is mounted on the bolt 35 and is rotatable therewith because of the flat section of the bolt to which it is attached. Thus, rotation of the blade 25 will rotate the gear 40 and move the base portion of the blade 28 in one direction as the upper end of the blade is moved in the opposite direction by the pivot bolt 29. There is thus obtained by positive gear action the same general type of motion as that obtainable with the modification shown in Figs. 1 to 6, inclusive. However, in this gear drive, an increased leverage or mechanical amplification is obtained, since this modification has the same handles as the modification shown in Fig. 1.

Figure 12:
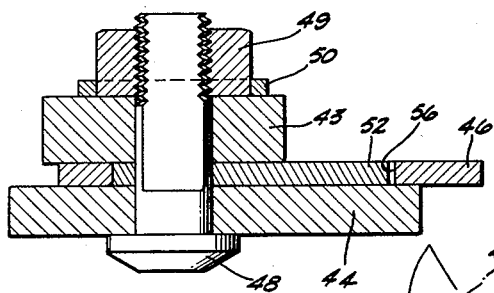
Fig. 12 is a partial cross-sectional view taken along the line 12—12 of Fig. 11.
Figure 10:
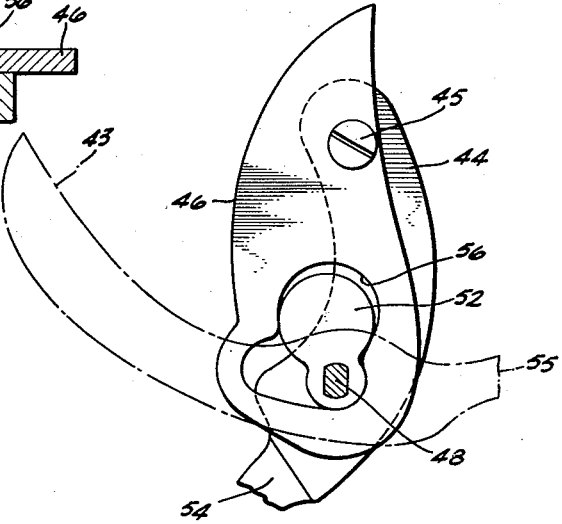
Fig. 10 is a partial elevational view of another modification embodying the invention.
Figure 11:
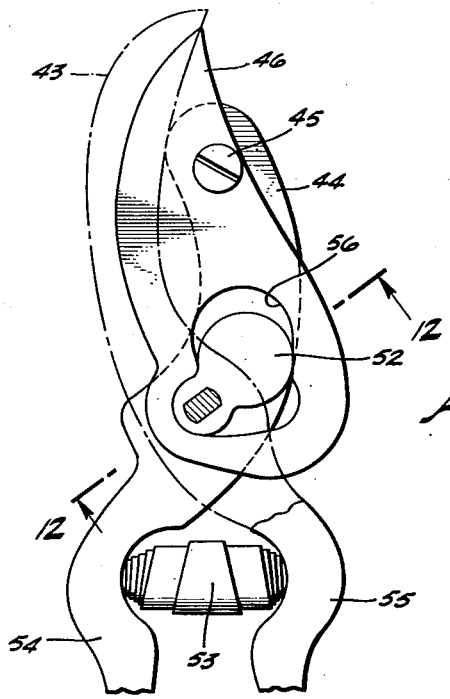
Fig. 11 is a partial elevational view of the modification of the invention shown in Fig. 10, showing another position of the cutting blades.

Referring now to Figs. 10, 11, and 12, a cam type of drive for the base portion of the blade is shown. A blade or jaw 43 is similar to blades 5 and 25 of Figs. 1 and 7, respectively, while section 44 has pivoted thereon by bolt 45 a convex cutting blade 46. Again, the blade 43 and arm 44 are pivoted on a bolt 48 having a nut 49 and washer 50. This bolt has a centralized flat portion, on which is mounted a cam 52. The spring 53 interposed between handles 54 and 55 is shown for urging the blades apart.

In this modification, the blade 46 has its point moved towards the blade 43 by the pivot 45, and simultaneously has its base moved in the opposite direction by the movement of the cam 52 in an associated slot 56. Thus, this modification also provides the same general type of slicing action in addition to the normal shearing action, which permits the shears to provide easily-made clean cuts. Also, each pair of shears provides a mechanical amplification permitting the shears to be used for heavy limbs and stems while still providing clean cuts.

We claim:

1. A pair of shears comprising a pair of pivotally-connected handles, a blade integral with one of said handles on one side of the pivot of said handles, a section integral with said other handle on the same side of the pivot of said handles as said blade, an oscillatory cutting blade having a pointed tip portion and a base portion extending across said pivot, said base portion having a slot therein into which said pivot extends, means for attaching the tip portion of said oscillatory blade adjacent the tip of said section for rotation of said oscillatory blade on said section, and means attached to said pivot point for shifting the base edge of said cutting blade away from said first-mentioned blade as said tip portion of said oscillatory cutting blade approaches said first-mentioned blade.

2. A pair of shears comprising a pair of handles, a pivot connection for said handles, one of said handles extending on one side of said pivot to form a jaw for said shears, the other of said handles having an extension on the same side of said pivot as said jaw, a cutting blade mounted for rotation adjacent its tip and the tip of said extension, said blade having a wide base portion extending across said pivot in the direction of movement thereof, said base portion having a slot therein into which said pivot extends and along which said pivot moves as said handles are actuated toward and away from each other, and means for actuating said base portion of said blade across said pivot.

3. A pair of shears in accordance with claim 2, in which said means includes an element mounted on said pivot point and rotated thereby when said first mentioned handle is moved to actuate the base portion of said blade across said pivot.

4. A pair of shears in accordance with claim 2, in which said slot in said cutting blade has a rack section along one edge thereof and a partial gear section is provided in mesh with said rack and mounted for rotation by rotation of said pivot by movement of said first mentioned handle.

5. A pair of shears in accordance with claim 2, in which said means includes an ear at the base of said jaw and having a pin therein, said pin being also in said cutting blade.

6. A pair of shears in accordance with claim 2, in which a toothed rack is provided along one side of said slot in the base portion of said cutting blade and said means includes a gear section in mesh with said rack and mounted on said pivot of said handles, actuation of said handles rotating said gear section.

7. A pair of shears in accordance with claim 2, in which an opening is formed in the base portion of said cutting blade, said means including a cam mounted on said pivot of said handles and positioned in said opening, actuation of said handles rotating said cam and shifting the base portion of said cutting blade with respect to its tip portion.

References Cited in the file of this patent

UNITED STATES PATENTS

| 326,314 | McKay | Sept. 15, 1885 |
| 374,358 | Hamann | Dec. 6, 1887 |
| 393,197 | Woolley et al. | Nov. 20, 1888 |
| 985,048 | Meissner | Feb. 21, 1911 |
| 2,436,260 | Klenk | Feb. 17, 1948 |

FOREIGN PATENTS

| 344,572 | France | Sept. 7, 1904 |